United States Patent [19]

Pinnavaia et al.

[11] Patent Number: 5,298,473
[45] Date of Patent: Mar. 29, 1994

[54] HYDRATED LIME CLAY COMPOSITES FOR THE REMOVAL OF $SO_x$ FROM FLUE GAS STREAMS

[75] Inventors: Thomas J. Pinnavaia; Jayantha Amarasekera, both of East Lansing, Mich.

[73] Assignee: Board of Trustees operating Michigan State University, East Lansing, Mich.

[21] Appl. No.: 961,367

[22] Filed: Oct. 15, 1992

Related U.S. Application Data

[63] Continuation-in-part of Ser. No. 553,254, Jul. 16, 1990, Pat. No. 5,219,536, and a continuation-in-part of Ser. No. 779,645, Oct. 21, 1991, Pat. No. 5,160,715, and a continuation-in-part of Ser. No. 846,583, Mar. 5, 1992.

[51] Int. Cl.$^5$ ............................ B01J 20/12; B01J 21/16
[52] U.S. Cl. ......................................................... 502/84
[58] Field of Search ........................................ 502/84

[56] References Cited

U.S. PATENT DOCUMENTS

| | | | |
|---|---|---|---|
| 4,387,653 | 6/1983 | Voss | 110/342 |
| 4,731,233 | 3/1988 | Thompson et al. | 423/231 |
| 4,804,521 | 2/1989 | Rochelle et al. | 423/242 |
| 4,830,840 | 5/1989 | Bhattacharyya | 423/239 |
| 4,931,264 | 6/1990 | Rochelle et al. | 423/242 |
| 4,952,382 | 8/1990 | van Broekhoven | 423/244 |
| 4,981,825 | 1/1991 | Pinnavaia et al. | 502/84 |
| 5,126,300 | 6/1992 | Pinnavaia et al. | 502/84 |

OTHER PUBLICATIONS

Gullett, B. K. and Blom, J. A., React. Solids, 3 (1987) 337–350.
Gullett, B. K., Blom, J. A. and Cunningham, R. T., React Solids, 6 (1988) 263–275.
Chang, E. Y. and Thodes, G., AIChE J., 30 (1984) 450–457.
Thibault, J. D., Steward, F. R. and Ruthven, D. M., Can. J. Chem. Eng., 60 (1982) 796–801.
Chang, J. C. S. and Kaplan, N., Envir. Prog., 3 (1987) 267–274.
Fuller, E. L. and Yoos, T. R., Langmuir, 3 753 (1987) 753–760.
Jozewicz, W., Chang, J. C. S., Sedman, C. B. and Brna, T. G., JAPCA, 38 (1988) 796–805.
Jozewicz, W., Chang, J. C. S., Sedman, C. B. and Brna, T. G., EPA/600/d-87/095, (NTIS PB87-17585-7/AS)(1987).
Jozewicz, W., Chang, J. C. S., Sedman, C. B. and Brna, T. G., EPA/600/D-87/135, (NTIS P87-182663)(1987).
Jozewicz, W., Chang, J. C. S., Sedman, C. B. and Brna, T. G., React. Solids, 6 (1988) 243–262.
Chang, J. C. S., Kaplan, N. and Brna, T. G. in "Fossil Fuels Utilization: Environmental Concerns" (Eds. R. Markuszewski, B. Blaustein) Chap. 15)(1986).
"Crystal Structures of Clay Minerals and Their X-ray Identification" (Eds. Brindley, G. W. and Brown, G.) Chap. 1.)(1980).
"Crystal structures of Clay Minerals and Their X-ray Identification" (Eds. Brindley, G. W. and Brown, G.) Chap. 3 Mineralogical Society, London (1980).
Laszlo, P., Science, 235 (1987) 1473–1477.
Neuwmann et al. in, Z. Electrochem., 38, 304 to 310 (1932).
Rightor, E. G., Tzou, M. and Pinnavaia, T. J., Catalysis, vol. 130, p. 29, (1991).

*Primary Examiner*—Carl F. Dees
*Attorney, Agent, or Firm*—Ian C. McLeod

[57] ABSTRACT

The preparation and the use of base/clay composites materials as sorbents for the removal of $SO_2$ and $SO_3$ ($SO_x$) from flue gas and other sulfur containing gas streams is described. The base is either an alkaline earth metal carbonate (e.g. $CaCO_3$) or hydroxide (e.g. $Ca(OH)_2$) and is incorporated onto the clay by hydrating a dry physical mixture of an alkaline earth metal oxide, a smectite clay and a second metal oxide, or metal oxide precursor to form a powdered composite material. The second metal oxide, preferably selected from transition metal ions, act as an oxidation catalyst for the conversion of sulfur dioxide to sulfur trioxide. The use of clay as dispersing agent for both the basic oxide and the catalytic oxide component decreases the particle agglomeration of base particles and increases the rate of $SO_x$ uptake compared to the bulk bases in current use.

89 Claims, 1 Drawing Sheet

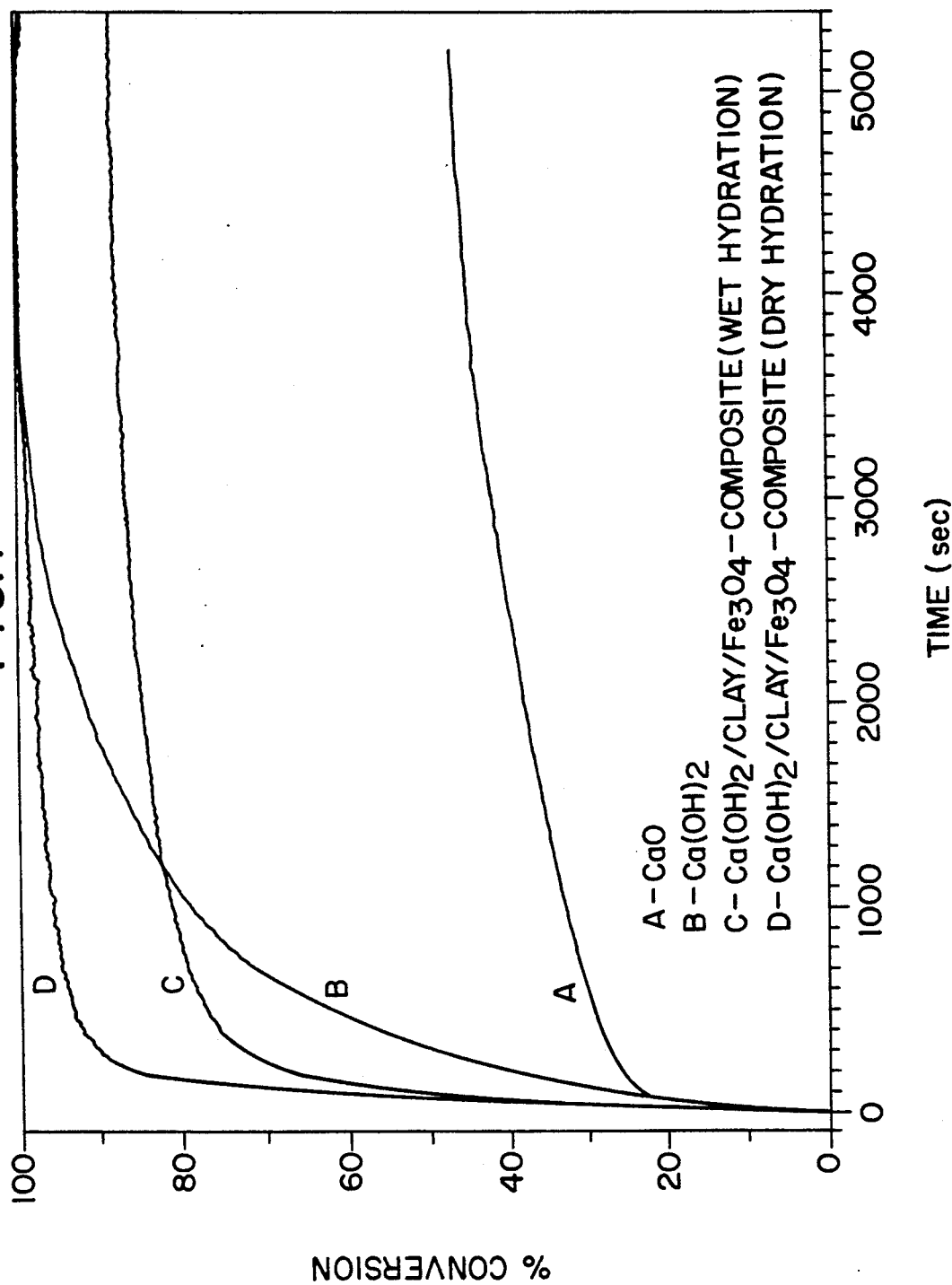

HYDRATED LIME CLAY COMPOSITES FOR THE REMOVAL OF $SO_x$ FROM FLUE GAS STREAMS

CROSS REFERENCE TO RELATED APPLICATIONS

This application is a continuation-in-part of application Ser. No. 07/553,254, filed Jul. 16, 1990 now U.S. Pat. No. 5,219,536, application Ser. No. 07/779,645 filed Oct. 21, 1991 now U.S. Pat. No. 5,160,715 and of application Ser. No. 07/846,583, filed Mar. 5, 1992 pending.

BACKGROUND OF THE INVENTION

(1) Field of the Invention

This invention relates to the method for the preparation of base/clay composites for the removal of $SO_x$, (sulfur dioxide and sulfur trioxide), from sulfur-containing gas streams, particularly flue gas from coal burning power plants, and to the process of using these sorbents for the removal of $SO_x$. The composites contain a base component selected from alkaline earth metal hydroxides and/or carbonates and a second metal oxide or oxide precursor, preferably selected from transition metal ions, capable of promoting the oxidation of sulfur dioxide to sulfur trioxide, and a dispersing agent selected from the smectite clays to disperse the base and catalyst.

(2) Prior Art

Coal represents the large resource of fossil energy in the world, today. For example, it has been estimated that the known coal reserves in the U.S. alone could supply sufficient energy for domestic consumption for several hundred years. One of the major problem of using coal, as energy source is the presence of sulfur. As a result, in fossil-fuel-fired power plants, the sulfur content of the feed coal is oxidized during combustion to sulfur oxides ($SO_2$ and $SO_3$, commonly referred to as "$SO_x$"), which are released through stacks to the atmosphere. Analyses of flue gas produced by power plants burning coal before desulfurization, show 0.5%–0.2% $SO_2$ and about 0.005% $SO_3$. One of the most serious environmental problems associated with such sulfur emissions is the generation of sulfuric acid, resulting in so called "acid rain".

Control of sulfur oxide emissions is mandated by the United States Environmental Protection Agency (EPA), and in 1970, the Clean Air Act Amendments were adopted by U.S. Government for this purpose This legislation provided for enforcement, by EPA, of $SO_x$ emissions limits for power plants constructed or modified after Aug. 17, 1971. This Act spurred extensive flue gas desulfurization (FGD) research and various studies are under way to develop methods for $SO_x$ removal from flue gas streams. As of January 1984, calcium based, wet, throwaway systems (including lime, limestone, and alkaline-ash systems) accounted for 84 percent of existing and planned FGD capacity The Clean Air Act was amended in 1977 and very recently in 1990, to require further control of $SO_x$ emissions. The Clean Air Act of 1990 requires, among other things, that coal-fired power plants cut sulfur dioxide emissions by half, or about 9 million tons annually, in the next decade. Increasing federal regulations and the high cost to construct and operate existing wet FGD units have encouraged continued research on new or modified flue gas cleanup processes.

Controlling the emissions of $SO_x$ from power plants is a world-wide problem and research into its control is a global effort. Formation of $SO_x$ in combustion processes can be reduced by modifying the burner design and combustion system, by changing the operating conditions and by using fuels with lower sulfur contents. The most popular and inexpensive method of reducing $SO_x$ emission is the addition of reactive dry sorbents with the fuel. Accordingly at present, $SO_x$ removal is most often accomplished by using lime (CaO), lime stone ($CaCO_3$) or hydrated lime ($Ca(OH)_2$) due to cost effectiveness and available quantities. For example, in U.S. Pat. No. 4,731,233 to Thompson and Nuzio, describe the use of these calcium based sorbents to reduce $SO_x$ emissions from flue gas streams.

In typical coal-fired power plants the ground sorbent, for example lime or limestone, is added into boilers along with coal or sprayed into towers as a slurry to contact the flue gas. The $SO_2$ reacts with calcium hydroxide to form a calcium sulfite slurry which is then partially oxidized with air to calcium sulfate. In this way the sulfur oxides are retained as harmless solid compounds which can be removed from the stack gas by electrostatic precipitation or other standard methods. Such a process is potentially attractive for retro-fitting existing power plants since no major structural alterations are required.

Although calcium based systems are the major source of $SO_x$ control, they are not without problems. Agglomeration of particles can be a serious problem that results in a less than optimal conversion to $CaSO_x$, ($CaSO_3$ and $CaSO_4$). The activity of the calcium species decreases as its particle size increases. Also $CaSO_x$ occupies more volume than CaO, the common active species. Therefore, an increase in volume occurs as the reaction proceeds, which causes a loss in the original porous character of the CaO. This results in a blockage of $SO_x$ and $O_2$ to the active CaO centers (Gullett, B. K. and Blom, J. A., React. Solids, 3 337 (1987); Gullett, B. K., Blom, J. A. and Cunningham, R. T., React. Solids, 6 263 (1988); Chang, E. Y. and Thodes, G., AIChE J., 30 450 (1984); Thibault, J. D., Steward, F. R. and Ruthven, D. M., Can. J. Chem. Eng., 60 796 (1982)). Hence in the relatively short contact time available, only a small fraction of the sorbent reacts. In principle the problem of low utilization of the sorbents may be solved by reducing the particle size, but in practice, the particle size required for a reasonable level of utilization may be too small to achieve economically by conventional grinding or fragmentation methods.

Prior art in this field considered several methods to develop reactive limestone, lime or hydrated lime as a precursor for the active CaO species or has used Ca(OH)$_2$ as the active species. Generally, the active species has been used as a bulk phase and not as a dispersed species (Chang, J. C. S. and Kaplan, N., Envir. Prog., 3 267 (1984); Gullett, B. K., Blom, J. A. and Cunningham, R. T., React. Solids, 6 263 (1988); Chang, E. Y. and Thodes, G., AIChE J., 30 450 (1984); Fuller El L. and Yoos, T. R., Langmuir, 3 753 (1987)).

Recent work has concentrated on the addition of fly ash to $Ca(OH)_2$ to enhance its activity in $SO_x$ control (Jozewicz, W. and Rochelle, G. T., Envir. Prog, 5 219 (1986); Jozewicz, W., Chang, J. C. S., Sedman, C. B. and Brna, T. G., JAPCA, 38 796 (1988); Jozewicz, W., Chang, J. C. S., Sedman, C. B. and Brna, T. G., React. Solids, 6 243 (1988); Jozewicz, W., Chang, J. C. S., Sedman, C. B. and Brna, T. G., EPA/600/d-87/095, (NTIS PB87-175857/AS); Jozewicz, W., Chang, J. C.

S., Sedman, C. B. and Brna, T. G., EPA/600/D-87/135, (NTIS PB87-182663). The fly ash is a siliceous material and it is believed that formation of various calcium silicates occur. Several diatomaceous earths, including clays such as montmorillonites and kaolins have also been identified as suitable silicates to obtain reactive silica for the formation of calcium silicates(Jozewicz, W., Chang, J. C. S., Sedman, C. B. and Brna, T. G., React. Solids, 6 243 (1988)). In coal burning power plants these sorbents were claimed to be suitable for the cold-side $SO_x$ removal where sorbents are added to the duct-work down stream of the boiler. The enhanced reactivity observed in these sorbents were attributed to the presence of different forms of calcium silicates. These results have been also disclosed in U.S. Pat. Nos. 4,804,521 and 4,931,264.

Voss in U.S. Pat. No. 4,387,653 describes limestone-based sorbent agglomerates that are suitable for the removal of sulfur-containing compounds such as hydrogen sulfide and sulfur oxides arising from combustion of organic fuels such as coal in fluidized bed units. The agglomerates are prepared using the conventional aggregation technology by mechanically crushing the naturally occurring limestone into grains of fine particle size and then binding the powdered limestone grains together with a binder. Different types of clays including, attapulgites, and other smectite clays have been used as suitable binders. Use of binders facilitated the formation of agglomerates with certain particle size ($-14$ to $+32$ mesh) that are ideal for the proper fluidization of particles in the fluidized bed combustion of coal.

U.S. Pat. No. 4,830,840 describes a sorbent composition containing an alkaline earth metal, aluminum-containing spinel/clay compositions for $SO_x$ capture. Spinels are mixed metal oxides that posses chemical compositions different from simple alkaline earth metal oxides or their carbonates and hydroxides. Furthermore, this U.S. patent describes the use of kaolin clay as the matrix material, which has different properties than smectite type clays. The major distinction of smectite type clays compared to kaolin type clays is the ability of smectites to swell in water. These swelling properties are in part responsible for the higher reactivity of the sorbents of this invention.

U.S. Pat. No. 4,952,382 to van Broekhoven has recently disclosed a catalyst composition suitable for the refining of heavy sulfur- and metal-containing petroleum feeds. An "anionic clay" component present in the catalyst serves as the sorbent for the removal of $SO_x$ from feed gas in fludized catalytic cracking units. Anionic clays are primarily synthetic clays, with very low natural abundance. In contrast to the smectite clays, the layers in anionic clays are composed of non-silicate materials. Moreover, the layers are positively charged, and hence anions rather than cations are found in the gallery region between the layers. As a result they do not undergo swelling in water and show completely different properties than smectite clays.

(3) Objects

A principal object of the present invention is to provide sorbent compositions suitable for diminishing $SO_x$ from flue gas streams particularly from coal-fired power plants. It is an object to provide highly reactive sorbent compositions with nano-scale particulates which give better $SO_x$ uptake in shorter time duration to overcome the low utilization of common oxide sorbents such as CaO and MgO due to mass transfer limitation and low reactivity towards $SO_2$. A further object of the present invention is to employ modified and improved methods to disperse alkaline earth metal containing bases on clay supports. Further, it is an object of the present invention to provide composite sorbent compositions that are inexpensive to produce. These and other objects will become increasingly apparent by reference to the following description and the drawing.

IN THE DRAWING

FIG. 1 is a graph showing the $SO_2$ reactivity of different calcium-containing sorbents based upon $SO_2$ uptake at 900° C. in a 80% $N_2$ and 20% $O_2$ stream containing 5000 ppm $SO_2$. The percent conversion is expressed as fraction of Ca sites converted to $CaSO_4$. The transition metal loading is 5.4 g Fe as $Fe_3O_4$ per 100 g of CaO.

GENERAL DESCRIPTION

The present invention relates to a method for preparing a composite material useful for $SO_x$ removal from the flue gas of a coal-burning power plant and other gas streams which comprises: providing a mixture consisting of a powdered smectite clay, a powdered basic compound which is an alkaline earth metal oxide, a second metal ion selected from the group consisting of a powdered metal oxide and oxide precursor, which catalyzes oxidation of sulfur dioxide to sulfur trioxide in an amount sufficient so that said composite composition promotes the oxidation of the sulfur dioxide to sulfur trioxide at sulfur dioxide oxidation conditions in the presence of sufficient water to hydrate the alkaline earth metal oxide; mixing the resulting mixture to insure the homogeneity of the mixture, wherein when the mixture is heated to a temperature of 500° C. or above, the $SO_x$ components from a gas stream are removed by the composite upon contacting with the said gas stream at that temperature.

In the present invention sorbents where clay acts as a dispersing agent are disclosed to disperse the base particles to obtain highly reactive composite powders that are suitable for direct injection into conventional boilers that lack fluidized bed technology. The sorbents prepared retain their powder composite form upon injection into a boiler. Thus, the composite powders of the present invention differ from Voss's aggregates, and are not intended for fluidized-bed applications.

The present invention relates to a method for preparing composite materials useful for the absorption of $SO_x$ components from gas streams and to the processes of using these sorbents for the removal of $SO_x$ components from the flue gas of a coal-burning power plant and other sulfur-containing gas streams. In each method, a transition metal component capable of promoting the oxidation of $SO_2$ to $SO_3$ is introduced into the base/clay composite using different transition metal precursors.

Further, the present invention relates to a method for preparing a composite material useful for $SO_x$ removal from the flue gas of a coal-burning power plant and other gas streams which comprises: providing a homogeneous dry physical mixture of a powdered smectite clay, a powdered basic compound which is an alkaline earth metal oxide, a second metal ion selected from the group consisting of a powdered metal oxide and metal oxide precursor which catalyzes oxidation of sulfur dioxide to sulfur trioxide in amounts so that the composite composition promotes the oxidation of the sulfur dioxide to sulfur trioxide at sulfur dioxide oxidation conditions; adding an amount of water to the homogeneous dry physical mixture so that the alkaline earth metal oxide is hydrated to an alkaline earth metal hydroxide while retaining a particulate mixture; and mixing the particulate mixture for an additional period of time to complete the hydration process to provide the composite material, wherein when the composite is heated to a temperature of 500° C. or above, the $SO_x$ components from a gas stream are removed by the composite upon contacting with the said gas stream at that temperature.

Further still, the present invention relates to a method for preparing a composite material useful for $SO_x$ removal from the flue gas of a coal-burning power plant and other gas streams which comprises: providing a dry homogeneous physical mixture consisting of a quantity of powdered smectite clay, a quantity of powdered basic compound which is an alkaline earth metal oxide, a second metal ion selected from the group consisting of a powdered metal oxide and a metal oxide precursor which catalyzes oxidation of sulfur dioxide to sulfur trioxide, in an amount so that the composite composition promotes the oxidation of the sulfur dioxide to sulfur trioxide at sulfur dioxide oxidation conditions; adding an amount of water in the presence of a source of carbon dioxide gas to the homogeneous dry physical mixture so that alkaline earth metal oxides form an alkaline earth hydroxide which is in part converted to an alkaline earth carbonate by the carbon dioxide alkaline earth metal carbonates while retaining a particulate mixture; and mixing the dry particulate mixture for an additional period of time in the presence of the source of carbon dioxide gas to complete the carbonation process to provide the composite material, wherein when the composite is heated to a temperature of 500° C. or above, the $SO_x$ components from a gas stream are removed by the composite upon contacting with the said gas stream at that temperature.

In Ser. No. 07/553,254 it was disclosed that the preparation of a clay-composite material is useful for removing $SO_x$ from a gas stream. In this application it was disclosed that alkali and alkaline earth oxides or carbonates such as $NaHCO_3$ and $CaCO_3$ were precipitated in the presence of a smectite clay suspensions from respective salts or was impregnated onto clay using water soluble compounds. When these composite materials are heated to at least 500° C. the $SO_x$ is removed from the gas streams by the basic compound.

In accordance with one method of the previous invention, a 0.5 to 1.5 weight percent, wt. %, aqueous suspension of clay was initially prepared. An aqueous solution of $Na_2CO_3$ was added dropwise to the clay suspension while it was stirred. This was followed by a similar addition of $CaCl_2.2H_2O$. The addition of the calcium species caused the precipitation of $CaCO_3$. The amount of $Na_2CO_3$ and $CaCl_2.2H_2O$ was varied to provide the desired weight ratio of $CaCO_3$ to clay. The product was washed with deionized distilled water, either by centrifugation/decantation or by dialysis, to remove the excess chloride and sodium ions before drying. Washing the preparation was preferred, because reactivity with $SO_x$ was diminished if no attempt was made to remove the chloride. The adverse effect of chloride on $SO_x$ removal has also been verified by another study which evaluated the effects of magnesium and chloride ions on the performance of limestone-regenerated dual alkali processes under closed-loop operating conditions (Chang, J. C. S., Kaplan, N. and Brna, T. G. in "Fossil Fuels Utilization: Environmental Concerns" (Eds. R. Markuszewski, B. Blaustein) Chap. 15). Limestone reactivity decreased with the increase of chloride ion concentration. The effect was especially pronounced after a concentration of 80,000 ppm was reached. The base-clay composites, were thus, thoroughly washed by employing several wash cycles.

One difficulty with this earlier process of making base-clay composites is the extensive washing procedure involved during the synthesis to remove chloride ions. In an industrial scale preparation, this would be a serious economic disadvantage. Application Ser. No. 719,987 filed Jun. 24, 1991 and now U.S. Pat. No. 5,126,300 discloses an improved synthesis of calcium carbonate or calcium hydroxide containing clay composites which are suitable for removing $SO_x$ components from flue gas streams has been disclosed. In this improved process, lime was used as the precursor base components along with smectite type clays, which is then converted into slaked lime, $Ca(OH)_2$ in water or to $CaCO_3$ in the presence of carbon dioxide. In a typical experiment lime is added to a clay slurry, preferably a 1 wt. % slurry, with good stirring. The $Ca(OH)_2$/clay slurry thus obtained is filtered and dried to isolate the clay/base composite. The treatment of $Ca(OH)_2$/clay slurry with carbon dioxide gas resulted in formation of $CaCO_3$/clay composites.

These applications disclosed methods for the production of composite materials consisting of alkaline earth metal bases and smectite clay composites, of varying alkaline earth metal base to clay ratios that had not been known in the prior art, especially, and most preferably, by causing the formation of $Ca(OH)_2$ or $CaCO_3$ from CaO onto and between clay particles while the dispersed clay is in aqueous suspension.

A major draw back with these base/clay composite sorbents is the low utilization of the base components in the sorbents. The rate of adsorption of $SO_x$ declines with increasing conversion, due to low reactivity of $SO_2$. Hence in the relatively short contact time available (1 to 300 seconds), only about 50-70% of the basic Ca sites in the sorbent reacts. For example the $CaCO_3$/Na-montmorillonite composite which contained 3:1 CaO/clay, when exposed to $SO_2$ (5% v/v) containing stream of nitrogen for 5 min, showed that only 68.7% Ca sites in the composite was reactive towards $SO_x$. Upon exposing the composite to the same gas stream for 1 hour caused only 78.6% reactivity of Ca sites to $SO_x$.

To overcome the low utilization of basic alkaline earth metal sites in these clay/base composites, in a recent patent application Ser. No. 846,583, filed Mar. 5, 1992, the incorporation of a second metal oxide to improve the $SO_x$ reactivities is disclosed. The second metal oxide or oxide precursor, preferably selected from the transition metal ions, capable of promoting the oxidation of sulfur dioxide to sulfur trioxide is incorporated into the base/clay composites during their syntheses in the form of either metal oxides or water soluble metal salts or as metal-containing clays.

The use of clay as a dispersing agent for both the basic oxide and the catalytic oxide component increased the rate of $SO_x$ uptake compared to bulk bases in current use. For example, when 5.4% Fe (based on CaO used) was incorporated as $Fe_2O_3$ solid, the composite showed a 99.8% conversion of Ca sites to $CaSO_4$ when exposed to 0.5% v/v $SO_2$ for one hour, with 91.6% conversion within the first 5 min. period. For comparison a similar composite which was prepared without incorporating any oxidation catalyst resulted in a conversion of 76.7% of Ca sites in the composite to $CaSO_4$ under a similar condition, with only 68.7% conversion within first 5 min. period. In another words, for 1 h. reaction with $SO_x$, the incorporation of iron as $Fe_2O_3$, had improved the $SO_x$ uptake by the composite by about 20%. Comparable results were also observed when iron is incorporated as other iron oxides such as $Fe_3O_4$, FeOOH or pickle liquor, in these composites. Much better results were observed when the transition metal $SO_2$ oxidation catalyst was vanadium. For example, incorporation of 5.4% V (based on CaO) as $V_2O_5$ into 5.4:1 $CaCO_3$:Na-montmorillonite composite resulted in 98.3% conversion of Ca sites to $CaSO_4$ within first 5 minutes of exposure to $SO_2$ containing gas streams. Several other composites that contained transition metal oxides such as CuO and $CrO_3$ also gave sorbents that react with $SO_2$ effectively.

All these powder composites mentioned above were prepared by in situ precipitation of $Ca(OH)_2$ or $CaCO_3$ in dilute clay slurries (typically a 1 wt. % slurry). In another words, this process involves a "wet hydration" technique. It is known in the prior art that, for the hydration of lime if large excess of water is used, particularly if the water is cold, an adverse effect called "drowning" occur. The surface of the lime particles hydrates quickly, but the mass of hydrate formed impedes the penetration of the water into the center of particles delaying the rupture of the particles into micro particles The rise in temperature is stifled and hydration is delayed, resulting in incomplete hydration. As result reactivity toward $SO_x$ is lessened. Furthermore, the preparation methods of composites disclosed in this invention involved large amounts of solvent handling. This was found to be a major draw back, especially in the scale up syntheses. The precipitated clay composites had to be filtered, dried and powdered before the materials were ready for flue-gas scrubbing.

The present invention involves the preparation of a clay composite suitable for $SO_x$ absorption while minimizing the use of excessive water and avoiding liquid handling. Therefore, improved syntheses are disclosed for the preparation of much more reactive base/clay composites suitable for the removal of $SO_x$ components from gas streams. In these improved syntheses the clay, lime and a oxidation catalyst in their powdered forms are preferably first dry blended in a blender to obtain a homogeneous mixture. This solid mixture is then hydrated by slow addition of water (about 30 minutes per 100 lb batch is preferred) to obtain powdered clay composite that are rich in $Ca(OH)_2$ with the retention of free-flowing powder character. This hydration technique is referred hereinafter in this disclosure as the "dry hydration" process. Furthermore, these mixtures can be carbonylated, if desired, during the hydrolysis step to obtain $CaCO_3$ rich composite powders.

The clays utilized in this invention are members of the smectite group of hydrous 2:1 layer lattice silicates containing two-dimensional tetrahedral sheets of composition $T_2O_5$ (T=tetrahedral cation, i.e. $Si^{4+}$, $Al^{3+}$, or $Fe^{3+}$), in which individual tetrahedra are linked with neighboring tetrahedra by sharing three corners each (the basal oxygens) to form an hexagonal mesh pattern. The fourth tetrahedral corner (the apical oxygen) points in a direction normal to the sheet and at the same time forms part of the immediately adjacent octahedral sheet in which individual octahedra are linked laterally by sharing octahedral edges. The octahedral cations are usually $Mg^{2+}$, $Al^{3+}$, $Fe^{2+}$, and $Fe^{3+}$, but other medium-sized cations also occur in some species. The presence of iron in the clay can be beneficial at $SO_2$ uptake temperatures of 700° C. or less, since iron centers catalyze the oxidation of $SO_2$ to more reactive $SO_3$ in this temperature range.

The smallest structural unit of a smectite clay contains three octahedra. If all three octahedra are occupied, the sheet is classified as trioctahedral. If only two octahedra are occupied and the third octahedron is vacant, the sheet is classified as dioctahedral. The assemblage formed by linking two-tetrahedral sheets with one octahedral sheet is known as a 2:1 layer. The linkage is achieved by inverting the upper tetrahedral sheet so that its apical oxygens point down and can be shared by the octahedral sheet below. Both octahedral anion planes then are of the same O, OH composition. If the 2:1 layers are not electrostatically neutral, the excess layer charge is neutralized by various interlayer materials, including individual cations, and hydroxide octahedral groups and sheets ("Crystal Structures of Clay Minerals and Their X-ray Identification" (Eds. Brindley, G. W. and Brown, G.) Chap 1.)

Smectites are a type of 2:1 layered silicates. General formulas for di- and trioctahedral smectites are as follows:

dioctahedral
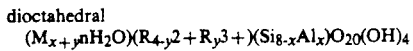

trioctahedral
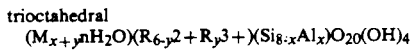

per unit cell. These 2:1 layered silicates have an electron charge/unit cell between 0.4 and 1.2. Montmorillonite is the most common smectite and refers to the dioctahedral Al, Mg smectite with the layer charge arising mainly from the Mg-for-Al substitutions in the octahedral position, i.e. $(M_y+nH_2O)(Al_{4-y}Mg_y)Si_8O_{20}(OH)_4$ per unit cell. Montmorillonites generally have total specific surface areas of the order of 500–850 $m^2/g$, which includes both the interlayer and external surface area ("Crystal structures of Clay Minerals and Their X-ray Identification" (Eds. Brindley, G. W. and Brown G.) Chap. 3, and Laszlo, P., Science, 235 1473 (1987)).

Smectite clays also have the ability to swell in water. The swelling ability of the clay depends upon whether a monovalent or divalent cation is used to neutralize the clay layers. Monovalent ions tend to remain more or less associated with the silicate layers when hydration occurs but divalent ions tend to move into the Water layers. Thus the silicate layers and their associated monovalent ions behave in a similar manner to neutral entities with the layers becoming fully dispersed in water. Divalent ion clays appear to be dispersed in small packets generally compromising 4–5 layers. Divalent ions link pairs of layers together by satisfying two negative charges in a manner which monovalent ions cannot.

The oxidation catalyst introduced into these composites is preferably a component of a metal selected from the transition metals, rare earth metals, and Group 14 in the periodic table. Some of the known transition metal and transition metal oxide catalysts that are suitable for $SO_2$ oxidation include Pt, $WO_3$, Ag, $Ag_3VO_4$, $Cu_3(VO_4)_2$, $V_2O_5$, $Fe_2O_3$, $TiO_2$, CuO, $CrO_3$, $MnO_2$, $PbO_2$, $MoO_3$, $CeO_2$, $Cr_2O_3$, $SnO_2$ and ZnO. Platinum is an excellent oxidation catalyst, and other oxides such as vanadium pentoxide and iron oxides are also especially effective for catalyzing the oxidation to $SO_2$ to $SO_3$; see for example, Neuwmann et. al. in, *Z. Electrochem.*, 38, 304 to 310 (1932). The catalytic process on these oxides will involve the following steps: sorption of $SO_2$ to form a sulfite, oxidation of sulfite to sulfate, and sulfate decomposition with evolution of $SO_3$. Thus, for a particular metal oxide sorbent, the selection of a good metal oxide catalyst for $SO_2$ oxidation is very important. Requirements for a good catalyst can be compared to those for the $SO_2$ sorbent. For the catalyst, all three steps are surface reactions and should occur at the reaction temperature. For the $SO_2$ sorbent, the first two steps should occur as bulk reactions converting much of the sorbent to sulfate during sorption at the reaction temperature. The last step should occur at a higher temperature. Typically, alkali metal oxides and its salts meet these latter requirements and find suitable for $SO_x$ capture. The alkali metal oxide such as CaO reacts with $SO_3$ readily at temperatures above 600° C. to form thermally stable sulfates. To enhance the reactivity of base and to improve the performance of the oxidation catalyst, both the base component and the catalyst are dispersed on smectite type clays.

The formation of $Ca(OH)_2$ or $CaCO_3$ in the presence of a smectite clay is an ideal method for preparing a dispersed base. Segregating the basic particles and preventing their sintering by compositing with clay particles minimizes mass transfer limitations and results in more efficient use of base/sorbent and faster removal of $SO_2$ from the gas stream. The highly dispersed $CaCO_3$ or $Ca(OH)_2$ particles decompose in the furnace to CaO. The presence of a highly dispersed clay suspension facilitates a uniform dispersion of the CaO particles as well as $SO_2$ oxidation catalyst. The dispersed base in the composite material thus possesses a different dispersion than when the base is present as the bulk phase. A dispersed base on a clay support will have a much smaller particle size than could be obtained by grinding. The oxidation catalyst selected from transition metal group elements, when present in these composites facilitates the oxidation of $SO_2$ to $SO_3$. The $SO_3$ is more reactive than $SO_2$ by itself, and chemisorbs onto the highly reactive base metal oxide (CaO) more effectively to form harmless solid compounds containing metal sulfates. For example, when Fe is present as $Fe_2O_3$ in these composites, it promotes the conversion of $SO_2$ to more reactive $SO_3$. The $SO_3$ thus formed is easily captured by the highly dispersed basic CaO sites to form thermally stable $CaSO_4$. The greater dispersion of the base particles in the composite is conducive to the reaction of the base with reactive $SO_3$ resulting in a more efficient use of the available base. An improvement in $SO_x$ reactivity has been observed with composites containing only small amounts of clay. A ratio of 9:1 base to clay still results in improved uptake over conventional bulk base systems.

In the present invention, typically lime, clay and transition metal oxides are dry blended in their powdered form in a blender to obtain a homogeneous dry mixture. This mixture is then carefully hydrated, to convert lime to the hydrated lime using water, to produce $Ca(OH)_2$ dispersed clay composites. Carbon dioxide ($CO_2$) gas can also be introduced during the hydration process in order to form composites that are rich in $CaCO_3$. The products obtained from this "dry hydration" process are free flowing composite powders and are suitable for the injection into the boilers of the coal-burning power plants for the removal of $SO_x$ from flue gas streams.

In one embodiment, a dry physical mixture of pulverized (particle size $-325$ mesh, $-45$ microns) clay, lime and a oxidation catalyst were mixed in a blender to obtain a homogeneous mixture. Typically, a lime to clay ratio of 3:1 was used in this invention. However, this ratio could be varied between 1:1 and 10:1 to incorporate more clay or more lime into the composites. Presence of increased amounts of clay help the base particles to disperse on the clay much more efficiently and increased amounts of lime would introduce more base sites into the composites. The oxidation catalyst preferably employed was black iron oxide pigment ($Fe_3O_4$). The amount of iron oxide used was about 7% based on CaO present in the mixture. This amount was about 5.5g Fe for each 100 g CaO. The amount of catalyst loading could be varied in the range 1 to 20% w/w based on lime used. This homogeneous dry physical mixture was then hydrolyzed by slow addition of warm water (temperature between 50°–80° C.). The water addition was done in batch-wise to prevent the sudden increase of reaction temperature, and after each addition the solid mixture was thoroughly mixed in the blender. Alternatively, the hydration could be performed in a suitable hydrator by continuously spraying the required amount of water into the dry physical mixture of clay, lime and oxidation catalyst while blending process occur. The amount of water used for this hydration step depends on the type of lime used and the type of clay being employed. Typically 1 to 50% stoichiometric excess of water based on the amount of lime used, was employed. After the water addition was completed, the product was allowed to age in the blender for additional 15–30 min. to provide ample time to complete the hydration process. The action of water on CaO results in the formation of $Ca(OH)_2$ in essentially quantitative yields, as judged by x-ray powder diffraction. The temperature rise associated with the hydration of free lime, together with the presence of the water helps to exfoliate the clay for improved dispersion of the hydrated lime particles. It is preferred that the intrinsic size of the clay platelets be in the range 0.2–2 microns. The blending procedure is carried out to facilitate the proper dispersion of basic $Ca(OH)_2$ particles onto the smectite clay platelets. The products isolated were dark grey powders.

The most important step in the sorbent preparation is the hydration of the dry solid mixture. To obtain highly reactive $Ca(OH)_2$-containing clay composites, it is necessary to control the water/solids ratio and the temperature of the water. Typically, 1 to 50% excess of stoichiometric amount of water is used for the hydration of lime. The amount of water required for the complete hydration of the lime depends on the type of lime and clay used. An excess amount of water is used in order to compensate the water adsorption by the clay. Use of larger excess water would result in formation of composites with higher moisture contents (>5% w/w). In general, high moisture contents reduce the free flowing tendency of the composite powders and for these reasons high moisture contents are less preferred.

The other extreme is adding insufficient water to the lime, causing the hydrates to be sintered, due to the generation of excessive temperatures. The preferred temperature of hydration is just below the boiling point of water. Rapid increase in temperature also results in too much of loss of water as steam and causing incomplete hydration. It is thus, preferred the use of warm water (temperature between 60° and 80° C.) for the hydration of the clay/lime/iron oxide mixture. The addition of water is done slowly in small portions or sprayed evenly using a slow spray rate to prevent sudden temperature rise. Furthermore, use of lower amounts of water would cause inadequate swelling of clay, which could hamper the proper dispersion of base particles and catalysts. During the addition of water, it is essential to maintain a proper agitation of the solid mixture not only to effectively and evenly hydrate the mixture but also to minimize the aggregation of particles.

The mixing of dry solids, clay, lime and transition metal oxide can be done in any suitable blender, that would give good mixing. For example, samples were blended in laboratory scale using WARING blenders. Large scale preparations for the pilot scale testings were carried out using commercial blenders such as twin shell blend hydrators and batch hydrators (Littleford, Cincinnati, Ohio).

The lime employed in the syntheses disclosed in this invention was obtained from Mississippi Lime Company, Ste. Genevieve, Mo. However, other types of lime from different sources also could be used in any of the processes disclosed in this invention. For example, the magnesium containing-lime obtained from Dravo Lime Company's Black River location (Ohio) also tested and found to be equally good in capturing $SO_x$ contents from flue gas streams. The clay used is Na-bentonite, mineralogically known as Na-montmorillonite, and can be varied to any other smectite type clay with swelling properties. These include laponite, hectorite, fluorohectorite, bentonites, and the like. Instead of $Fe_3O_4$ several other transition metal oxides which are capable of oxidizing sulfur dioxide to sulfur trioxide, such as $Fe_2O_3$, FeOOH, $TiO_2$, $CrO_3$, CuO and $V_2O_5$ are also employed in this disclosure, although the types of transition metals are not limited to these examples. Most of these oxides can be obtained commercially as oxide pigments. All these composites show higher reactivities towards $SO_x$ than the basic oxide/clay composites in absence of a transition metal oxide catalyst (Table 1).

TABLE 1

Activity of Base/Clay Composites for Removal of $SO_2$ from a Gas Stream[a].

| Base | Clay | Catalyst | Catalyst Loading g metal/ 100 g CaO | % Conversion[b] 5 min. | 60 min. | Ex. No. |
|---|---|---|---|---|---|---|
| $Ca(OH)_2$ | Na.bent | $Fe_3O_4$ | 5.4 | 90.6 | 99.6 | 2 |
| | | $Fe_2O_3$ | 5.4 | 89.0 | 99.5 | 2 |
| | | $V_2O_5$ | 5.4 | 98.9 | 100.8 | 2 |
| | | $TiO_2$ | 5.4 | 87.5 | 98.5 | 2 |
| | Fe-mont | $Fe_2O_3$ | ca.10 | 85.2 | 99.0 | 8 |
| | Cr-mont | $CrO_3$ | ca. 7 | 89.2 | 99.4 | 9 |
| | Na-mont [Impreg.with Fe(NO$_3$)$_3$] | $Fe_2O_3$ | 3.5 | 82.5 | 95.2 | 5 |
| | [Impreg.with (NH$_4$)VO$_3$] | $V_2O_5$ | 3.0 | 98.5 | 100.2 | 5 |
| $Ca(OH)_2/$ | Na-bent. | $Fe_3O_4$ | 5.4 | 92.6 | 99.8 | 4 |
| $CaCO_3$ | Fe-mont | $Fe_2O_3$ | ca. 10 | 88.2 | 99.0 | 4 |
| | Cr-mont | $CrO_3$ | ca. 7 | 92.1 | 100.6 | 4 |
| CaO | Na-bent. | $Fe_3O_4$ | 5.4 | 76.8 | 89.8 | 1 |
| $Ca(OH)_2$ | none | none | — | 65.3 | 92.6 | C |

TABLE 1-continued

Activity of Base/Clay Composites for Removal of $SO_2$ from a Gas Stream[a].

| Base | Clay (CaO/clay = 3/1 w/w) | Catalyst | Catalyst Loading g metal/ 100 g CaO | % Conversion[b] 5 min. | 60 min. | Ex. No. |
|---|---|---|---|---|---|---|
| CaO | none | none | — | 27.6 | 44.6 | C |

[a]At 900° C.; 5000 ppm $SO_2$.
[b]Fraction of Ca sites converted to $CaSO_4$
C, CaO, Ca(OH)$_2$ all from Mississippi Lime Co. Genevieve, Missouri.
Abbreviations: mont., montmorillonite; bent., bentonite; pill., pillared.

In a broader sense the present invention uses clay composites in controlling the sulfur oxides from gas streams, more particularly from coal-fired boiler systems. These systems include a boiler, economizer and dust collectors such as electrostatic precipitator or bag filter house ("bag house"). The injection of the sorbents into these, particularly to the boiler (700°–1200° C.), along with coal has been considered in this invention. Thus, the clay composites prepared as described above, were thermally treated in a temperature programmed thermogravimetric balance at a temperature range of 500°–1000° C. in a stream of air or nitrogen/oxygen mixture, and $SO_2$ gas was introduced. The amount of $SO_2$ reacted with the sorbents Was monitored as the weight uptake as described below.

The reaction of thermally activated base/clay sorbents with $SO_2$ was tested using the following experimental method. The base/clay composites prepared are heated to 900° C. under a stream of 70% nitrogen and 20% oxygen in a temperature programmed thermogravimetric balance at a rate of 5° C./min. Heating the composites to 900° C. converted the $Ca(OH)_2$ and $CaCO_3$ components to CaO, and as a result a lost in sample weight was observed. This heated sample was then exposed to $SO_2$ containing stream of air at 0.5% v/v concentration, at a flow rate of 200 ml/min for 1 h. Exposing the heated composite to $SO_2$ containing gas stream rapidly converted the CaO sites to $CaSO_4$. As a result a weight increase was observed and this weight increase corresponded to the amount of $SO_x$ adsorbed. For example, when 5.4% Fe (based on CaO used) was incorporated as $Fe_3O_4$ solid, the composite showed a 98.2% conversion of Ca sites to $CaSO_4$ when exposed to 0.5% v/v $SO_2$ for one hour, with 89.5% conversion within the first 5 min. period. For comparison, a similar composite which was prepared according to our earlier application Ser. No. 07/846,583, filed Mar. 5, 1992, by adding lime and iron oxide to a clay slurry (i.e., "wet hydration" method) exhibited a conversion of 88.6% of Ca sites in the composite to $CaSO_4$ under a similar condition, with only 73.5% conversion within first 5 min. period. In another words, for a 5 min. reaction time with $SO_x$, the dry composite formed by the hydration process exhibited improved $SO_x$ uptake of about 22%. The $SO_x$ reactivities of these two materials are compared in FIG. 1. Similar results were observed when the transition metal $SO_2$ oxidation catalyst was vanadium. For example, incorporation of 5.4% V (based on CaO) as $V_2O_5$ into a composite prepared according to the above method resulted in 98.9% conversion of Ca sites to $CaSO_4$ within first 5 minutes of exposure to $SO_2$ containing gas streams. The reactivity of the sorbents prepared by the dry hydration technique can be compared with unhydrated dry mixtures. For instance, the dry CaO, lime, clay dry mixture showed only 89.8% conversion of Ca sites to Ca within 1 h. exposure to $SO_2$ with 76.8% conversion in first 5 min.

The composites formulated by the dry hydration method contained $Ca(OH)_2$ as the predominant calcium source, with minor quantities of $CaCO_3$ due to the reaction with atmospheric carbon dioxide. The reaction of CaO/clay mixture with water converts almost all of the CaO to $Ca(OH)_2$ during the preparation of above the clay-containing composites. On the other hand, by exposing the $Ca(OH)_2$/clay composites during the hydration process to an atmosphere rich in $CO_2$, one may prepare a clay composite containing calcium largely in the form of $CaCO_3$. The present invention also relates to a method for preparing these clay composite materials that are rich in $CaCO_3$, which are suitable for removing $SO_x$ from a flue gas and other gas streams, by introducing carbon dioxide gas during the hydration of lime. The powder XRD studies of the products isolated showed the conversion of CaO or $Ca(OH)_2$ to $CaCO_3$.

Composites which contained $CaCO_3$ as the base along with transition metal oxide as the catalyst also showed good $SO_x$ reactivities. For example, when 5.4% Fe (based on CaO used) was incorporated as $Fe_2O_3$ solid, the composite showed a 99.8% conversion of Ca sites to $CaSO_4$ when exposed to 0.5% v/v $SO_2$ for one hour, With 92.6% conversion within the first 5 min. period. For comparison a similar composite which was prepared using $Fe_3O_4$ oxidation catalyst according to the methods disclosed in Ser. No. 07/846,583 resulted in a conversion of 98.8of Ca sites in the composite to $CaSO_4$ under a similar condition, with only 89.4% conversion within first 5 min. period.

The transition metal component, capable of promoting the oxidation of $SO_2$ to $SO_3$ is introduced to the composite in several different ways. In the first method disclosed above, the transition metal is introduced as a metal oxide in the form of a finely divided powder along with pulverized CaO, during the composite formation. In the second method, the transition metal oxide is added to water that is being used to hydrate the clay/lime solid mixture, as a water soluble transition metal salt. In another preferred method, the $SO_2$ oxidation catalysts are present in the clay structure, either in the clay galleries or clay layers as transition metal containing cations. Upon calcination, the composites prepared according to these methods formed reactive metal oxide catalysts capable of oxidizing $SO_2$ to $SO_3$ at elevated temperatures.

Accordingly, in another preferred method, the clay/base dry physical mixtures were treated with finely divided, water soluble transition metal salts which were capable of oxidizing $SO_2$ to $SO_3$. As described above, a dry physical mixture was prepared by mixing the smectite clay with the basic material, CaO. This mixture was then hydrated using a warm solution containing transition metal ions using the conditions described earlier. The amount of transition metal ions present in this aqueous solution as a water soluble salts could be in the range between 1 to 10 wt. %. Depending on the solubility of each transition-metal containing salt, the amounts of transition metals that could be incorporated into the composites in this manner may vary. The incorporation of 0.1 to 10% transition metal ions based on the CaO present in the composites, showed better $SO_x$ reactivities.

Several transition metal salts such as, $NH_4VO_3$, $FeCl_3$, $Fe(NO_3)_3$ were employed. Upon calcination, the composites prepared in this manner formed reactive metal oxide catalysts capable of oxidizing $SO_2$ to $SO_3$ at elevated temperatures. For example, when 5.4% V (based on CaO used) was incorporated as $NV_4VO_3$, the composite showed a 100% conversion of Ca sites to $CaSO_4$ when exposed to 0.5% v/v $SO_2$ for one hour, with 98.5% conversion occurring the first 5 min. period.

Alternatively, transition metal oxides can be introduced as aqueous sols during the composite preparation. For example, in one method disclosed in this invention iron oxide was introduced as aqueous $Fe_3O_4$ sols. In addition to the water for the hydration of lime, these sols provide very fine oxide particles that are much more effectively dispersed in the composite. Accordingly, a homogeneous dry physical mixture containing clay and lime was hydrated as described before using an aqueous $Fe_3O_4$ sol. The composites prepared in this manner also showed very good $SO_x$ uptakes.

Generally, the transition metal salt can be a simple water-soluble form such as a carbonate, sulfate, acetate, formate or it may be a water soluble metal complex containing chelates such as oxalate, malonate, succinate, glutarate, maleoate, phthalate, tartarate, acetylacetonate and its derivatives, hydrazine and its derivatives and mixtures of above. The primary criterion for choosing a complexing agent or agents is that the agent or the agents chosen provide a "water soluble" metal compound, and should not have a substantial detrimental effect on the present process or on the product composite composition. As pointed out earlier, nitrate and chloride salts are not suitable, since these ions lower the $SO_x$ reactivity of the composites. The composite impregnated by metal salt, when dried and thermally treated to reaction temperature, may exist in the final product at least in part as a compound such as the oxide, sulfide, and the like or in the elemental state.

In another preferred method, the $SO_2$ oxidation catalysts are introduced into the clay structure, particularly into the clay galleries as transition metal containing cations. Both iron-pillared and chromia-pillared montmorillonites clays were employed for base/clay composite preparation. These clays contained Fe and Cr metals respectively, in the form of hydroxo-cations in their galleries. Upon calcination, the hydroxy-metal ions decompose to corresponding metal oxides which are capable of oxidizing $SO_2$ to $SO_3$ at elevated temperatures within clay galleries. Accordingly, several clay/base composites were prepared according to the methods disclosed above using the dry hydration method using CaO as the base and transition metal pillared-smectite clays as the dispersing agent, to isolate a composite compositions that were rich in $Ca(OH)_2$. Alternatively, the above hydration process was carried out in the presence of carbon dioxide gas to isolate a composites that are rich in $CaCO_3$. The composites prepared in this manner showed very good reactivities towards $SO_2$. For example, $Ca(OH)_2$/Fe-pillared clay composite showed a conversion of almost all of Ca sites to $CaSO_4$ when exposed to 0.5% v/v $SO_2$ for one hour, with 85.2% conversion occurring during the first 5 min. Similarly, $Ca(OH)_2$/Cr-pillared clay composite showed a 99.4% conversion of Ca sites to $CaSO_4$ after 1 hour exposure to $SO_2$ under similar conditions with 89.2% conversion occurring during first 5 min. conversion occurring during first 5 min.

In another method disclosed in this invention, the hydration of lime was carried out using an aqueous clay slurry. A 10 wt. % aqueous clay slurry was prepared by dispersing enough clay in the measured quantity of water that was being employed to hydrate the dry physical mixture of lime, oxide catalyst and remaining amount of clay. This clay slurry was then added to the dry physical mixture. The hydration was carried out in a controlled manner as described earlier, by adding small amounts of aqueous clay slurry at a time to the dry physical mixture. The composites prepared in this manner also showed very good $SO_x$ reactivities.

The base/clay composites disclosed in this invention show very good $SO_x$ reactivities, compared to lime or hydrated lime, especially within short time exposures to the $SO_2$ containing gas streams. (FIG. 1). For example, Mississippi lime showed only 27.6% conversion of its Ca sites to $CaSO_4$ upon exposure to $SO_2$ for 5 min. and under similar conditions hydrated lime showed only a conversion of 65.3%. Corresponding reactivity observed for $Ca(OH)_2$/Clay/$Fe_2O_3$ composite prepared according to the dry hydration method according to this invention showed more than 91% conversion of ca sites to its sulfate within first 5 min. of exposure to $SO_2$ containing gas. Therefore, these materials serve as good sorbents for boiler injection Where the residence time would be few seconds. Accordingly, several composites prepared according to this invention were evaluated for their reactivity toward $SO_x$ capture in a coal fired boiler using a pilot test reactor. This reactor simulated a typical boiler conditions of a coal-burning power plant. The sorbents were injected from the bottom of the reactor. The average boiler temperature Was between 1150°–1250° C., and average $SO_2$ concentration, in the absence of a sorbent, was between 1200–1300 ppm. The amount of $SO_x$ depleted from the flue gas was monitored as a function of time. The results obtained for several clay/base sorbents are presented in Table 2. All the clay/base composites tested showed improved $SO_x$ reactivities, especially within a short time scale, compared to the lime and hydrated lime. For example, the composite where the $Ca(OH)_2$ is dispersed on the bentonite clay, showed a 59% reduction of $SO_x$ during the first 5 min. with 91% reduction after 20 min. exposure to $SO_x$, whereas, lime showed only 55% $SO_x$ reduction and $Ca(OH)_2$ showed only 59% reduction after 20 min. By comparison, a composite composition prepared according to Ser. No. 07/846,583 by precipitating $Ca(OH)_2$ on a dispersed bentonite clay, showed only a 48% reduction of $SO_x$ during the first 5 min. and 51% reduction after 20 min. Furthermore, a mixture of hydrated lime and $Fe_3O_4$ prepared by using a dry hydration technique as given in Example 2 starting with lime and $Fe_3O_4$ showed a $SO_x$ reduction of 68% after 20 min., indicating the important benefit derived from the presence of the clay matrices in these composites.

The methods developed in this invention result in the formation of $Ca(OH)_2$ and/or $CaCO_3$ clay composites without the use large amounts of water or any soluble base or a soluble base precursor. Further, the methods disclosed here do not require time consuming washing steps to remove excess sodium and chloride ions. Filtering, drying and grinding techniques also are eliminated. Therefore, the methods described in this patent are the preferred ones for the formation of $Ca(OH)_2$/clay/transition metal composites, $CaCO_3$/clay/transition metal composites, or mixed $Ca(OH)_2$ and $CaCO_3$/clay/transition metal composites of varying ratios, which are used to remove $SO_x$ from flue gas of coal-burning power plants.

There are several advantages of using smectite clays in these clay/base composites. The presence of swellable smectite clay of 0.2–2 micron size platelets allows the base particles to disperse on the clay particles, thus helping to minimize aggregation and sintering of the base particles. The clay/base composites prepared according to this invention have very high surface areas at elevated temperatures. For example, $Ca(OH)_2$/Clay/$Fe_3O_4$ composites showed surface areas in the range between 50–80 $m^2/g$ at 900° C. For comparison $Ca(OH)_2$ at this temperature had a surface area of 15 $m^2/g$. As a result, the composites show high SOx reactivities. Furthermore, due to the presence of clay the clay/base composites prepared according to this disclosure have very good free flowing characteristics compared to lime, $Ca(OH)_2$ or $CaCO_3$ and are an attractive class of materials for the furnace sorbent injection process. Moreover, the pilot scale testing experiments indicated that there is no scaling or clogging occurs inside the boiler or the duct-work from these composites. Thus, in a coal-fired boiler application, the present sorbents may be injected, into the combustion zone, (e.g., the boiler, at 700°–1000° C.) where combustion takes place, or added with coal. Sorbents then leave the combustion zone with coal ash and can be removed in the bag house or precipitator. This process in turn, provides enough contact time for the sorbents to react with $SO_x$ from the flue gas streams. Thus the flue gas leaving the combustion zone/contacting zone systems have reduced amounts of sulfur oxide relative to the processing in the absence of the present sorbents. Due to the presence of the clay support, the reacted sorbents also have a ceramic texture, which is ideal for safe disposal without serious environmental pollution.

SPECIFIC DESCRIPTION

EXAMPLE 1

This example describes the preparation of dry mixture of CaO and Na-Bentonite that contain different transition metal oxides capable of oxidizing $SO_2$ to $SO_3$.

Na-Bentonite clay "HPM-20" from America Colloidal Company, Belle Fourche, S. Dak. was selected as the representative member of the smectite family of 2:1 layer lattice silicates. The clay contained 10% by weight water. In order to prepare a dry mixture containing three parts of CaO and one part of clay with 5 g Fe for each 100 g of CaO the following procedure was used. In a laboratory blender ("WARING BLENDER" Waring Products, New Hartford, Conn.), placed 80 g of lime from Mississippi Lime Company, Ste., Genevieve, Mo., 26.5 g of bentonite clay and 6 g of black iron oxide ($Fe_3O_4$) pigment from Mobay Corporation, Pittsburgh, Pa. The solids were blended for 5–10 min. to obtain a gray homogeneous mixture. The blending time depend on the amount of materials used and the type of blender employed.

Several other dry physical mixtures can be prepared using different other iron oxides, especially different types of pigments such as red pigment ($Fe_2O_3$), black ($Fe_3O_4$) and yellow pigment (FeOOH). Furthermore, using the similar procedure, several other compositions containing different transition metals such as Cu, Cr, and V can be prepared using their oxides such as CuO, $CrO_3$ and $V_2O_5$.

EXAMPLE 2

The preparation of Ca(OH)$_2$/Na-Bentonite clay composites that contained different transition metal oxides that are capable of oxidizing SO$_2$ to SO$_3$ are described in this example.

The dry physical mixture obtained according to the Example 1 was treated with water to hydrate the clay and the lime. During the hydration procedure, lime is converted to Ca(OH)$_2$ and clay undergoes swelling. As a result, both Ca(OH)$_2$ and transition metal oxide catalyst will dispersed in between the swollen clay particles.

The dry physical mixture from example 1 was placed in a blender and treated with a 40 g of warm water (temperature between 60°-80° C.). The water was added in 1-2 ml portions, and after each additions the solids were agitated thoroughly to ensure proper hydration and good mixing. After the addition of water was completed the mixture was further blended for 5 min. and allowed to remain inside the blender with the lid closed for about 15 min. with good stirring, to complete the hydration process. The product obtained was a free flowing dark gray powder. An XRD pattern of the product showed a reflection at 7.1° (12.5 Å) characteristic of Na-bentonite and peaks at 18.0° (4.9 Å), 28.6° (3.1 Å), 34.0° (2.6 Å) and 47.1° (1.9Å) corresponding to precipitated Ca(OH)$_2$. Only a very weak reflection was seen at 29.5° (3.0 Å) due to the formation of CaCO$_3$ formed by reaction with atmospheric carbon dioxide. These XRD data indicated that essentially all of the CaO used had converted to Ca(OH)$_2$. The presence of Ca(OH)$_2$ was further confirmed by thermogravimetric analyses. The thergravimetric analysis at 120° C. also showed that the final product contained about 2% moisture.

Using a similar procedure, a base/clay composite was prepared using commercial grade Na-bentonite (HPM-20). In this procedure, a dry physical mixture of 50 lbs of lime, 16 lbs of clay and 3.8 lbs of iron oxide was hydrated in a Littleford/batch hydrator using 25 lbs of water to obtain 110 lbs of finished product. The moisture content of the final product was found to be 8.9% w/w.

The amount of water used in the above procedures represented about 50% excess of the stoichiometric amounts of water needed to fully hydrate the lime. Excess water compensates the water absorption by the clay. Depending on the type of lime used and the clay employed in the synthesis the amount of water required for the complete hydration of the lime and swelling of the clay may vary. The amount oxidation catalyst used in this example was about 5.4 wt. % Fe based on CaO used. The amount of oxidation catalyst can be varied from about 3-10 wt. % based on the CaO used. A series of Ca(OH)$_2$/Clay composites using different stoichiometric amounts of iron oxide, water and clay were prepared. For example, a Ca(OH)$_2$/Clay composite containing 3% Fe (based on CaO) was prepared in a Twin Shell Blend Hydrator (Patterson-Kelly Co., East Stroudsburg, Pa.) using 4 lbs of lime, 1.33 lbs of bentonite clay ("HPM 20"), 3 ounces of black Fe$_3$O$_4$ pigment and 24 ounces of water to produce 8.7 lbs of finished product with 0.8% w/w moisture content. The amount of water used in this example was about 10% in excess of the stoichiometric amount needed to fully hydrate the lime.

EXAMPLE 3

The preparation of Ca(OH)$_2$/Clay composites using a clay slurry is described in this example. A part or all of clay that is required for the preparation of base/clay composites is first dispersed in water that is being used to hydrate the lime.

In order to prepare a Ca(OH)$_2$/Clay composite that contained fifteen parts of CaO and one part of clay with 5 g iron for each 100 g of CaO, a dry physical mixture was prepared in a blender according to the procedure described in Example 1 using 80 g lime and 6 g black Fe$_3$O$_4$ pigment. This dry physical mixture in the blender was then treated with a thick 10% w/w clay slurry prepared by mixing 5.3 g of Na-bentonite clay in 53 g of water. The clay slurry was added in small portions and blended with the lime mixture over a period of 30 min. to ensure slow hydration. After the addition of water was completed, the mixture was further blended for about 15 min. to complete the hydration process. The product obtained was a free flowing dark gray powder. An XRD pattern of the product showed a reflection at 7.1° (12.5 Å) characteristic of Na-bentonite and peaks at 18.0° (4.9 Å), 28.6° (3.1 Å), 34.0° (2.6 Å) and 47.1° (1.9 Å) corresponding to precipitated Ca(OH)$_2$. The moisture content of the material, as measured by the weight loss at 120° C., was found to be 5% w/w.

The clay/base composites containing lower CaO/Clay ratios such as 3 parts of CaO and 1 part of clay can also be prepared by using 10% w/w clay slurry. The extra amount of clay is introduced into the dry physical mixture along with lime and iron oxide pigment prior to the hydration with 10% w/w clay. All these composites prepared in this manner showed very good SO$_x$ reactivities.

EXAMPLE 4

The preparation of a clay composite Ca(OH)$_2$/CaCO$_3$/Na-Bentonite that contained different transition metal oxides that are capable of oxidizing SO$_2$ to SO$_3$ are described in this example.

The procedure is similar to Example 2, except that hydration of the solid mixture was carried out in a CO$_2$ gas rich atmosphere to convert Ca(OH)$_2$ to CaCO$_3$. A stream of carbon dioxide gas was introduced into the reaction mixture to react with base component to form CaCO$_3$. The products isolated in this manner contained CaCO$_3$ as the major source of calcium alkali with minor quantities of Ca(OH)$_2$.

Alternatively, CO$_2$ can be introduced as dry ice during the hydration process. Accordingly, the same quantities of lime, clay and iron oxide as given in Example 1 was mixed with 150 g of crushed dry ice during they hydration process along with water according to the Examples 1 and 2. An XRD pattern of the product showed a reflection at 7.1° (12.5 Å) characteristic of Na-bentonite and peaks at 23.0° (3.9 Å), 29.4° (3.0 Å), 35.9° (2.49 Å), 39.4° (2.2 Å), 43.1° (2.1 Å), 47.5° (1.9 Å) and 48.5° (1.9 Å) due to precipitated CaCO$_3$. These XRD data indicated that these composites are rich in CaCO$_3$ and small amounts of Ca(OH)$_2$. These results are further confirmed by thermogravimetric analyses.

Using a similar procedure, several other clay/base composites containing different transition metals such as Fe, Cu, Cr, V were prepared using their oxides such as Fe$_3$O$_4$, FeOOH, CuO, CrO$_3$ and V$_2$O$_5$. Wide variety of composites were prepared by varying the CaO/clay ratio was well as CaO/transition metal oxide (oxidation catalyst).

EXAMPLE 5

The preparation of $CaCO_3$/Na-bentonite composites and $Ca(OH)_2$/Na-bentonite composites that contained different transition metal oxides are described in these examples. The transition metal oxides capable of oxidizing $SO_2$ to $SO_3$ are incorporated into the base/clay composites as a water soluble transition metal salts. Several transition metal salts such as $NH_4VO_3$, $FeCl_3$, $Fe(NO_3)_3$ are tested in this work. Upon calcination, the composites prepared in this manner formed reactive metal oxide catalysts capable of oxidzing $SO_2$ to $SO_3$.

To prepare a $Ca(OH)_2$ containing clay composite that contained iron oxidation catalyst, a dry physical mixture of clay and lime was prepared according to the procedure of example 1 using 80 g of lime and 26.4 g of Na-bentonite. This dry physical mixture was hydrated using a aqueous solution containing 10% w/w $Fe(NO_3)_3 \cdot 7H_2O$, according to the procedure of 2. The product contained about 3.5% Fe as $Fe_2O_3$. The product isolated was rich in $Ca(OH)_2$. In a similar manner a vanadium containing composite was prepared by using $NH_4VO_3$ as water soluble vanadium source.

Alternatively, iron as an oxidation catalyst can be introduced into the clay/base composites using aqueous iron oxide sols. Accordingly, a homogeneous dry physical mixture containing 3 parts of lime and one part of clay are hydrolyzed in a manner described in Example 2, using a 0.3% w/w aqueous $Fe_3O_4$ sol. The product isolated also showed good $SO_x$ reactivities.

In a similar manner, the same composite composition was prepared under a $CO_2$ gas atmosphere according to example 3, to obtain a composition that is rich in $CaCO_3$.

EXAMPLES 6-9

The following examples describes the incorporation of transition metals derivatives of montmorillonite capable of oxidizing $SO_2$ to $SO_3$ into composites rich in $Ca(OH)_2$ or $CaCO_3$. The transition metals are incorporated into the smectite clay gallery in the form of oxocations. In this manner both iron-pillared and chromia-pillared montmorillonite clays were used. Upon calcination, the composites prepared in this manner formed reactive metal oxide catalysts capable of oxidizing $SO_2$ to $SO_3$ at elevated temperatures.

EXAMPLE 6

This example describes the preparation of iron-pillared montmorillonite clay. The Fe-pillared montmorillonite clay was prepared according to the published procedure (Rightor, E. G., Tzou, M and Pinnavaia, T. J; J. Catalysis, vol 130, p 29, (1991).

Anhydrous sodium carbonate was added slowly as a powder to a rapidly stirred solution of 0.2M iron(III) nitrate. The amount of base added was about 2 meq/mole of metal. The solutions, which were free of a precipitate, were flushed with nitrogen to facilitate the removal of the carbon dioxide that was evolved during the hydrolysis. The solution was then aged for 24 hours at ambient temperatures. To exchange the $Na^+$ in montmorillonite clay with hydrolyzed iron cations, a 1.0 wt % suspension of the clay was added slowly to a vigorously stirred solution of the polycations. The ratio of the cation to clay was about 70 mmol/meq. Upon complete addition of clay the resultant slurry was further stirred for an additional two hours. The product was then washed to remove excess salt by the process of subsequent centrifugation, decantation, addition of deionized water, and re-dispersal of the product by vigorous stirring in water, until flocculation of clay occurred upon washing. The resultant Fe-pillared clay was air-dried on a glass plate at room temperature. The XRD pattern of the product showed a peaks at 3.1° and 6.3° corresponding to the basal spacing of 25.3 Å.

EXAMPLE 7

This example describes the preparation of chromia-pillared montmorillonite clay.

A 0.25M aqueous solution of sodium carbonate was added dropwise to a rapidly stirred solution of 0.05M chromium (III) nitrate. The amount of base added was about 2 meq/mole of Cr. The solution was then aged for 36 hours at 100° C. To exchange the $Na^+$ in montmorillonite clay with hydrolyzed chromium cations, a 1.0 wt % suspension of the clay was added slowly to a vigorously stirred solution of the polycations. The ratio of the cation to clay was about 60 mmol/meq. Upon complete addition of clay the resultant slurry was further stirred for an additional two hours. The product was then washed to remove excess slat by the process of subsequent centrifugation, decantation, addition of deionized water, and re-dispersal of the product by vigorous stirring in water, until flocculation of clay occurred upon washing. The resultant chromia-pillared clay was air-dried on a glass plate at room temperature. The XRD pattern of the product showed a peaks at 3.4° and 6.3° corresponding to the basal spacing of 25.9 Å.

EXAMPLES 8-9

The $Ca(OH)_2/CaCO_3$/clay and $Ca(OH)_2$/clay composites were prepared using either iron-pillared or chromia-pillared montmorillonites instead of Na-bentonite, using the procedures of Examples 1,2, and 4.

EXAMPLE 10

The samples prepared as described in Examples 1 to 5 and 8 to 9, above were evaluated for the performances towards the removal of $SO_2$ from a gas mixture according to the following procedure. The samples were heated to 900° C. at a rate of 5° C./min in a stream of 70% $N_2$ and 20% $O_2$ or in a stream of air. During this time, the $Ca(OH)_2$ in these composites decomposes to CaO at about 500° C. and $CaCO_3$ decomposes to CaO at about 850° C. The calcined samples were held at 900° C. for an additional 15 minutes and $SO_2$ gas was introduced. The concentration of $SO_2$ was 5000 ppm in flowing air or in $N_2/O_2$ mixture. At 900° C. the oxidation catalyst present in these composites converts $SO_2$ to $SO_3$, which in turn reacts with CaO to form thermally stable $CaSO_4$ according to the following reactions;

$$SO_2 + O_2 \rightarrow SO_3 \text{ (Fe}_2\text{O}_3 \text{ catalyst)}$$

$$CaO + SO_3 \rightarrow CaSO_4$$

The conversion of CaO to $CaSO_4$ was monitored by measuring the weight uptake of the sample, using a thermogravimetric balance. These results are presented in Table 1 set forth above.

For example $Ca(OH)_2/Fe_3O_4$-Na-bentonite composite that contained 3:1 CaO/clay and $Fe_3O_4$ solid (5.4% Fe/CaO) prepared according to the example 2 showed a conversion of 98.2 % Ca sites to $CaSO_4$ after 1 hour of reaction with $SO_2$ in which 89.5 % conversion occurring within the first 5 minutes of reaction. Comparable $SO_x$ reactivities were observed with other iron oxides (Table 1). Much better $SO_x$ reactivities were observed when the oxidation catalyst was $V_2O_5$. The $Ca(OH)_2/V_2O_5$-Na-bentonite composite that contained 3:1 CaO/clay and 5.4% V/CaO showed a conversion of almost all Ca sites to $CaSO_4$ within first 5 minutes. Similarly, all other composites including $Ca(OH)_2/CaCO_3$/transition metal oxide/Na-bentonite composites showed better $SO_x$ reactivities. For example a $Ca(OH)_2/CaCO_3/Fe_2O_3$/Na-bentonite composite that contained 3:1 CaO/clay and 5.4% Fe based on the CaO content and prepared according to example 3 showed a conversion of 99.8% Ca sites to $CaSO_4$ after 1 hour of reaction with $SO_2$ in which 92.6% conversion occurring within the first 5 minutes of reaction.

Composites that contained other transition metal oxides such as CuO, $CrO_3$ and $TiO_2$ also showed good $SO_x$ reactivities (Table 1). Composites prepared by using clays that contained transition metal ions in the clay galleries, also show higher $SO_x$ reactivities. For example, $Ca(OH)_2/CaCO_3$/Fe-pillared clay composite showed a 85.2% conversion of Ca sites to $CaSO_4$ within first 5 min of exposure to $SO_2$ containing gas. When composites are prepared using chromia-pillared clay, these composite also showed very good initial $SO_x$ reactivity.

EXAMPLE 11

Several Base/clay composites prepared according to the previous examples were evaluated for the performances towards removal of $SO_2$ from a flue gas stream of a coal burning boiler on a pilot plant scale. The pilot scale testings were performed using the Coal Combustor/Sorbent Injection system at Dravo Research Center, 3600 Neville Road, Pittsburgh, Pa. 152225. The test conditions are given below.

The base/clay composites were injected into a coal burning boiler operating at an average temperature between 1150° C. and 1250° C. Coal containing 2-2.8% sulfur was fed at a typical rate of 40-60 lb/hour and the sorbents were fed into the boiler at a rate between 50-110 g/min from the bottom of the boiler. The rate of coal injection and sorbent injections were selected in a typical experiment to meet the desired Ca:S ratio. The average $SO_2$ concentration in the flue gas was monitored at two points first immediately downstream of the furnace and the second near the filter baghouse. In the absence of a sorbent, the $SO_2$ concentrations in the flue gas were between 1200-1300 ppm. The amount of $SO_2$ depleted from the boiler in the presence of sorbents were measured as a function of time over a period of about 20 min. The results obtained for the clay/base composites were compared with pure lime, and hydrated lime and presented in Table 2.

TABLE 2

Performance of Base/Clay Composites in a Coal-Burning Boiler of a Pilot Plant Test Reactor.

| Sorbent | % $SO_x$ Removal After | | | |
|---|---|---|---|---|
| | 5 min | 10 min | 15 min | 20 min |
| CaO | 36 | 43 | 51 | 55 |
| $Ca(OH)_2$ | 61 | 64 | 61 | 59 |
| [1]$Ca(OH)_2$/Clay/$Fe_3O_4$ | 72 | 75 | 76 | 77 |
| [2]$Ca(OH)_2$/Clay/$Fe_3O_4$ | 56 | 55 | 52 | 51 |

TABLE 2-continued

Performance of Base/Clay Composites in a Coal-Burning Boiler of a Pilot Plant Test Reactor.

| Sorbent | % $SO_x$ Removal After | | | |
|---|---|---|---|---|
| | 5 min | 10 min | 15 min | 20 min |
| [1]$Ca(OH)_2$/$Fe_3O_4$ | 58 | 58 | 63 | 68 |

[1]Prepared by dry hydration method (Example 2)
[2]Prepared by wet hydration method Ser. No. 07/846,583.
CaO, $Ca(OH)_2$ were obtained from Mississippi Lime Co. Genevieve, Missouri.
Clay = Na-bentonite
Ca:S = 2:1; Sorbent particle size = −325 mesh; Average boiler flame temperature = 1150° C.-1250° C.

All the clay/base composites showed better $SO_x$ removal from the flue gas stream than Mississippi lime and hydrated lime. For example, a clay base composite prepared according to the Example 2 showed a very good 77% $SO_2$ reduction after 5 min of sorbent injection in to the boiler. Under similar conditions lime showed a 36% reduction whereas hydrated lime showed 61% reduction. The same composite composition prepared according to our previous disclosure Ser. No. 07/846,483 using a wet hydration method showed only 56% reduction of $SO_2$ after 5 min. Furthermore, these results clearly show the importance of having clay in these composites. A mixture of $Ca(OH)_2$ and $Fe_3O_4$ prepared according to the procedure of Example 2 by hydrating a mixture of CaO and $Fe_3O_4$ showed only 58% $SO_2$ reduction after 5 min.

It is intended that the foregoing description be only illustrative and that the present invention be limited only by the hereinafter appended claims.

We claim:

1. A method for preparing a composite material useful for $SO_x$ removal from the flue gas of a coal-burning power plant and other gas streams which comprises:
   (a) providing a homogeneous dry physical mixture of a powdered smectite clay, a powdered basic compound which is an alkaline earth metal oxide, a second metal ion selected from the group consisting of a powdered metal oxide and metal oxide precursor which catalyzes oxidation of sulfur dioxide to sulfur trioxide in amounts so that the composite composition promotes the oxidation of the sulfur dioxide to sulfur trioxide at sulfur dioxide oxidation conditions;
   (b) adding an amount of water to the homogeneous dry physical mixture so that the alkaline earth metal oxide is hydrated to an alkaline earth metal hydroxide while retaining a particulate mixture; and
   (c) mixing the particulate mixture for a additional period of time to complete the hydration process to provide the composite material, wherein when the composite is heated to a temperature of 500° C. or above.

2. The method of claim 1 wherein the of basic compound is present in an amount such that the weight ratio of oxide to clay in the composite is between about 1:1 and 10:1.

3. The method in accordance with claim 1 wherein the smectite clay is selected from the group consisting of montmorillonite, fluorohectorite, bentonite, nontronite, hectorite, saponite, and beidellite.

4. The method in accordance with claim 1 wherein the alkaline earth oxide is selected from the group consisting of magnesium and calcium and mixtures thereof.

5. The method of claim 1 wherein the said second metal ion is selected from the group consisting of transition metal cations, rare earth metal cations, and mixtures thereof.

6. A method in accordance with claim 1 wherein the second metal is selected from the group consisting of vanadium, iron, chromium, copper and titanium.

7. A method in accordance with claim 1 wherein the composite is heated to form a dry powder for the removal of $SO_x$ from gas streams.

8. The method of claim 1 wherein the said quantity of second metal ion present in an amount between about 0.1 to 20 percent by weight based on the metal oxide.

9. The method of claim 1 wherein the water used for the hydration of alkaline earth metal oxide to the hydroxide is in an amount between about 0.1 and 50% stoichiometric excess over the water is required to hydrate all of the alkaline earth metal oxide to the alkaline earth hydroxide.

10. A method for preparing a composite material useful for $SO_x$ removal from the flue gas of a coal-burning power plant and other gas streams which comprises:
(a) providing a dry homogeneous physical mixture consisting of a quantity of powdered smectite clay, a quantity of powdered basic compound which is an alkaline earth metal oxide, a second metal ion selected from the group consisting of a powdered metal oxide and a metal oxide precursor which catalyzes oxidation of sulfur dioxide to sulfur trioxide, in an amounts so that the composite composition promotes the oxidation of the sulfur dioxide to sulfur trioxide at sulfur dioxide oxidation conditions;
(b) adding an amount of water in the presence of a source of carbon dioxide gas to the homogeneous dry physical mixture so that alkaline earth metal oxides form an alkaline earth hydroxide which is in part converted to an alkaline earth carbonate by the carbon dioxide alkaline earth metal carbonates while retaining a particulate mixture; and
(c) mixing the dry particulate mixture for a additional period of time in the presence of the source of carbon dioxide gas to complete the carbonation process to provide the composite material, wherein when the composite is heated to a temperature of 500° C. or above.

11. The method of claim 10 Wherein the basic compound is present in an amount such that the weight ratio of oxide or hydroxide to clay in the composite is between about 1:1 and 10:1.

12. A method in accordance with claim 10 wherein the smectite clay is selected from the group consisting of montmorillonite, fluorohectorite, bentonite, nontronite, hectorite, saponite, and beidellite.

13. A method in accordance with claim 10 wherein the alkaline earth oxide is selected from the group consisting of magnesium and calcium and mixtures thereof.

14. The method of claim 10 wherein the said second metal ion is selected from the group consisting of transition metal cations, rare earth metal cations, and mixtures thereof.

15. A method in accordance with claim 10 wherein the second metal is vanadium, iron, chromium, copper and titanium.

16. A method in accordance with claim 10 wherein the composite is heated to form a dry powder for the removal of $SO_x$ from gas streams.

17. The method of claim 10 wherein the said quantity of second metal ion is between about 0.1 to 20 weight percent based on the metal oxides.

18. The method of claim 10 wherein a stream of carbon dioxide gas is used as the source of the carbon dioxide gas and which is introduced into the mixture during the hydration using water.

19. The method of claim 10 wherein crushed dry ice is used as the source of carbon dioxide gas and introduced into the mixture with water.

20. A method for preparing a composite material useful for $SO_x$ removal from the flue gas of a coal-burning power plant and other gas streams which comprises:
(a) providing a homogeneous dry physical mixture consisting of a powdered smectite clay, a quantity of powdered basic compound which is an alkaline earth metal oxide;
(b) adding water to the mixture in an amount sufficient to hydrate all of the alkaline earth metal oxide and containing a quantity of a second metal ion, in an amount sufficient that said composite composition promotes the oxidation of the sulfur dioxide to sulfur trioxide at sulfur dioxide oxidation conditions, while retaining the particular properties of the mixture; and
(c) mixing the particulate mixture for a additional period of time to complete the hydration process to provide the composite material, wherein when the composite is heated to a temperature of 500° C. or above.

21. The method of claim 20 wherein the basic compound is present in an amount such that the weight ratio of oxide or hydroxide to clay in the composite is between about 1:1 and 10:1.

22. A method in accordance with claim 20 wherein the smectite clay is selected from the group consisting of montmorillonite, fluorohectorite, bentonite, nontronite, hectorite, saponite, and beidellite.

23. A method in accordance with claim 20 wherein the alkaline earth oxide is selected from the group consisting of magnesium and calcium and mixtures thereof.

24. The method of claim 20 wherein the said second metal ion is selected from the group consisting of transition metal cations, rare earth metal cations, and mixtures thereof.

25. A method in accordance with claim 20 wherein the second metal ion is selected from the group consisting of vanadium, iron, chromium, copper and titanium.

26. The method of claim 20 wherein the said second metal ion is added in the form of water soluble metal salt in the water.

27. The method of claim 20 wherein the said second metal ion is added in the form of aqueous metal oxide sol to the water.

28. A method in accordance with claim 20 wherein the composite is dried and used as a dry powder for the removal of $SO_x$ from gas streams.

29. The method of claim 20 wherein the said quantity of second metal ion is between about 0.1 to 20 percent based on the metal oxides.

30. The method of claim 20 wherein the water used for the hydration of alkaline earth metal oxide to hydroxide is in amount between about 0.1 to 50% stoichiometric excess that is required to hydrate all of the alkaline earth metal oxide in the hydroxide.

31. A method for preparing a composite material useful for $SO_x$ removal from the flue gas of a coal-burning power plant and other gas streams which comprises:

(a) providing a homogeneous dry physical mixture consisting of a quantity of powdered smectite clay; a quantity of powdered basic compound selected from the group of alkaline earth metal oxides;

(b) adding an amount of water in an amount sufficient to hydrate all of the alkaline earth metal oxide and containing a second metal ion, in an amount sufficient that said composite composition promotes the oxidation of the sulfur dioxide to sulfur trioxide at sulfur dioxide oxidation conditions;

(c) adding a source of carbon dioxide gas in an amount sufficient that most of the hydrated alkaline earth metal oxide is converted to an alkaline earth metal carbonate while retaining the particulate properties of the mixture; and (d) mixing the mixture for a additional period of time in the presence of the source of carbon dioxide gas to complete the carbonation process to provide the composite material, wherein when the composite is heated to a temperature of 500° C. or above.

32. The method of claim 31 wherein the basic compound is present in an amount such that the weight ratio of oxide or hydroxide to clay in the composite is between 1:1 and 10:1.

33. A method in accordance with claim 31 wherein the smectite clay is selected from the group consisting of montmorillonite, fluorohectorite, bentonite, nontronite, hectorite, saponite, and beidellite.

34. A method in accordance with claim 31 wherein the alkaline earth oxide is selected from the group consisting of magnesium and calcium and mixtures thereof.

35. The method of claim 31 wherein the said second metal ion is selected from the group consisting of transition metal cations, rare earth metal cations, and mixtures thereof.

36. A method in accordance with claim 31 wherein the second metal ion is selected from the group consisting of vanadium, iron, chromium, copper and titanium.

37. The method of claim 31 wherein the said second metal ion is added in the form of water soluble metal salt in the water, which form reactive metal oxides at elevated temperatures capable of sulfur dioxide to sulfur trioxide, to the said quantity of water.

38. The method of claim 31 wherein the said second metal ion is added in the form of aqueous metal oxide sol in said water.

39. A method in accordance with claim 31 wherein the composite is dried and used as a dry powder for the removal of $SO_x$ from gas streams.

40. The method of claim 31 wherein the said quantity of second metal ion is present in an amount between about 0.1 to 20 percent based on the basic metal oxides.

41. The method of claim 31 wherein a stream of carbon dioxide gas is used as the source of carbon dioxide gas which is introduced into the mixture with the water.

42. A method of claim 31 wherein crushed dry ice is used as the source of carbon dioxide gas which is introduced into the mixture with the water.

43. The method for preparing a composite material useful for $SO_x$ removal from the flue gas of a coal-burning power plant and other gas streams which comprises:

(a) providing a homogeneous dry physical mixture of a powdered smectite clay, a powdered basic compound which is an alkaline earth metal oxide; a quantity of a second metal ion selected from the group consisting of a metal oxide and oxide precursor, which catalyzes oxidation of sulfur dioxide to sulfur trioxide in amounts sufficient so that the composite composition promotes the oxidation of the sulfur dioxide to sulfur trioxide at sulfur dioxide oxidation conditions;

(b) adding an amount of water containing a quantity of clay in the form of a clay slurry to the homogeneous dry physical mixture so that all of alkaline earth metal oxides are hydrated to an alkaline earth metal hydroxide while retaining a particulate properties mixture; and (c) mixing the particulate mixture for a additional period of time to complete the hydration process to provide the composite material, wherein when the composite is heated to a temperature of 500° C. or above.

44. The method of claim 43 wherein the said quantity of basic compound is present in an amount such that the weight ratio of hydroxide to clay in the composite is between about 1:1 and 10:1.

45. A method in accordance with claim 43 wherein the smectite clay is selected from the group consisting of montmorillonite, fluorohectorite, bentonite, nontronite, hectorite, saponite, and beidellite.

46. A method in accordance with claim 43 wherein the alkaline earth oxide is selected from the group consisting of magnesium and calcium and mixtures thereof.

47. The method of claim 43 the quantity of clay present in the water is between about 0.1 and 10% by weight.

48. The method of claim 43 wherein the said second metal ion is selected from the group consisting of transition metal cations, rare earth metal cations, and mixtures thereof.

49. A method in accordance with claim 43 wherein the second metal is selected from the group consisting of vanadium, iron, chromium, copper and titanium.

50. A method in accordance with claim 43 wherein the composite is dried.

51. The method of claim 43 wherein the second metal ion is present in an amount between about 0.1 to 20 percent based on the basic metal oxides.

52. The method of claim 43 wherein the water used for the hydration of alkaline earth metal oxide to the alkaline earth hydroxide is in an amount between about 0.1 to 50% stoichiometric excess over the water required to completely hydrate all of alkaline earth metal oxide in the composite to the alkaline earth hydroxide.

53. A method for preparing a composite material useful for $SO_x$ removal from the flue gas of a coal-burning power plant and other gas streams which comprises:

(a) providing a homogeneous dry physical mixture consisting of a powdered smectite clay, a powdered basic compound selected which is an alkaline earth metal oxide, a second metal ion selected from the group consisting of a powdered metal oxide and a metal oxide precursor, which catalyzes oxidation of sulfur dioxide to sulfur trioxide in amounts sufficient that said composite composition promotes the oxidation of the sulfur dioxide to sulfur trioxide at sulfur dioxide oxidation conditions;

(b) adding water containing clay as a clay slurry in the presence of a source of carbon dioxide gas to the homogeneous dry physical mixture in an amount sufficient that most of alkaline earth metal oxide forms an alkaline earth hydroxide which is in part converted to an alkaline earth carbonate by the carbon dioxide while retaining a particulate mixture; and (d) mixing the carbonate mixture for a additional period of time in the presence of the source of the carbon dioxide gas to provide the composite material, wherein when the composite is heated to a temperature of 500° C. or above.

54. The method of claim 53 wherein the basic compound is present in an amount such that the weight ratio of oxide or hydroxide to clay in the composite is between about 1:1 and 10:1.

55. A method in accordance with claim 53 wherein the smectite clay is selected from the group consisting of montmorillonite, fluorohectorite, bentonite, nontronite, hectorite, saponite, and beidellite.

56. A method in accordance with claim 53 wherein the alkaline earth oxide is selected from the group consisting of magnesium and calcium and mixtures thereof.

57. The method of claim 53 the clay is present in the water in an amount between about 0.1 and 10% by weight.

58. The method of claim 53 wherein the said second metal ion is selected from the group consisting of transition metal cations, rare earth metal cations, and mixtures thereof.

59. A method in accordance with claim 53 wherein the second metal is selected from the group consisting of vanadium, iron, chromium, copper and titanium.

60. A method in accordance with claim 53 wherein the composite is dried and used as a dry powder for the removal of $SO_x$ from gas streams.

61. The method of claim 53 wherein the second metal ion is present in an amount between about 0.1 to 20 percent by weight based on the basic metal oxides.

62. The method of claim 53 wherein a stream of carbon dioxide gas is used as the source of carbon dioxide gas and is introduced into the mixture with the water.

63. The method of claim 53 wherein crushed dry ice is used as the source of carbon dioxide gas and is introduced into the mixture with the water.

64. A method for preparing a composite material useful for $SO_x$ removal from the flue gas of a coal-burning power plant and other gas streams which comprises:
(a) providing a homogeneous dry physical mixture consisting of a powdered pillared smectite clay containing a transition metal, wherein the transition metal promotes the oxidation of sulfur dioxide to sulfur trioxide at sulfur dioxide oxidation conditions, and a quantity of powdered basic compound which is an alkaline earth metal oxide;
(b) adding a quantity of water to the homogeneous dry physical mixture in an amount sufficient that all of alkaline earth metal oxides are hydrated to an alkaline earth metal hydroxide while retaining a particulate mixture; and
(c) mixing the particulate mixture for a additional period of time to complete the hydration process to provide the composite material, wherein when the composite is heated to a temperature of 500° C. or above.

65. The method of claim 64 wherein the said quantity of basic compound is present in an amount such that the weight ratio of oxide to clay in the composite is between about 1:1 and 10:1.

66. A method in accordance with claim 64 wherein the smectite clay is selected from the group consisting of montmorillonite, fluorohectorite, bentonite, nontronite, hectorite, saponite, and beidellite.

67. A method in accordance with claim 64 wherein the alkaline earth oxide is selected from the group consisting of magnesium and calcium and mixtures thereof.

68. The method of claim 64 wherein the said second metal ion is selected from the group consisting of transition metal cations, rare earth metal cations, and mixtures thereof.

69. A method in accordance with claim 64 wherein the second metal is selected from the group consisting of vanadium, iron, chromium, copper and titanium.

70. A method in accordance with claim 64 wherein the base/clay composite is dried.

71. The method of claim 64 wherein the said quantity of second metal ion is in an amount between about 0.1 to 20 percent based on the metal oxide.

72. The method of claim 64 wherein the water used for the hydration of alkaline earth metal oxide to hydroxide is in an amount between about 0.1 to 50% stoichiometric excess over the water that is required to hydrate all of the alkaline earth metal oxide to the alkaline earth hydroxide.

73. A method for preparing a composite material useful for $SO_x$ removal from the flue gas of a coal-burning power plant and other gas streams which comprises:
(a) providing a homogeneous dry physical mixture consisting of a powdered pillared smectite clay containing a transition metal oxide, wherein the transition metal promotes the oxidation of sulfur dioxide to sulfur trioxide at sulfur dioxide oxidation conditions, and a powdered basic compound which is an alkaline earth metal oxide;
(b) adding water in the presence of a source of carbon dioxide gas to the homogeneous dry physical mixture in an amount sufficient that most of alkaline earth metal oxide forms an alkaline earth hydroxide which is in part converted to an alkaline earth carbonate while retaining a particulate mixture; and
(d) mixing the dry particulate mixture for a additional period of time in the presence of the source of the carbon dioxide gas to provide the composite material, wherein when the composite is heated to a temperature of 500° c. or above.

74. The method of claim 73 wherein the said quantity of basic compound is present in an amount such that the weight ratio of oxide or hydroxide to clay in the composite is between about 1:1 to 10:1.

75. The method in accordance with claim 73 wherein the smectite clay is selected from the group consisting of montmorillonite, fluorohectorite, bentonite, nontronite, hectorite, saponite, and beidellite.

76. The method in accordance with claim 73 wherein the alkaline earth oxide is selected from the group consisting of magnesium and calcium and mixtures thereof.

77. The method of claim 73 wherein the said second metal ion is selected from the group consisting of transition metal cations, rare earth metal cations, and mixtures thereof.

78. The method in accordance with claim 73 wherein the second metal is selected from the group consisting of vanadium, iron, chromium, copper and titanium.

79. The method in accordance with claim 73 wherein the composite is dried.

80. The method of claim 73 wherein the second metal ion is present in an amount between about 0.1 to 20 percent by weight based on the metal oxides.

81. The method of claim 73 wherein a stream of carbon dioxide gas is used as the source of carbon dioxide gas and introduced into the with the water.

82. The method of claim 73 wherein crushed dry ice is used as the source of carbon dioxide gas and introduced into the mixture with the water.

83. A method for preparing a composite material useful for $SO_x$ removal from the flue gas of a coal-burning power plant and other gas streams which comprises:
 (a) providing a mixture consisting of a powdered smectite clay, a powdered basic compound which is an alkaline earth metal oxide, a second metal ion selected from the group consisting of a powdered metal oxide and metal oxide precursor, which catalyzes oxidation of sulfur dioxide to sulfur trioxide in an amounts sufficient so that said composite composition promotes the oxidation of the sulfur dioxide to sulfur trioxide at sulfur dioxide oxidation conditions in the presence of sufficient water to hydrate the alkaline earth metal oxide;
 (b) mixing the resulting mixture to insure the homogeneity of the mixture, wherein when the mixture is heated to a temperature of 500° C. or above.

84. The method of claim 83 wherein the said quantity of basic compound is present in an amount such that the weight ratio of oxide to clay in the composite is between about 1:1 and 10:1.

85. A method in accordance with claim 83 wherein the smectite clay is selected from the group consisting of montmorillonite, fluorohectorite, bentonite, nontronite, hectorite, saponite, and beidellite.

86. A method in accordance with claim 83 wherein the alkaline earth oxide is selected from the group consisting of magnesium and calcium and mixtures thereof.

87. The method of claim 83 wherein the said second metal ion is selected from the group consisting of transition metal cations, rare earth metal cations, and mixtures thereof.

88. A method in accordance with claim 83 wherein the second metal is selected from the group consisting of vanadium, iron, chromium, copper and titanium.

89. The method of claim 83 wherein the said quantity of second metal ion is present in an amount between about 0.1 to 20 percent by weight based on the basic metal oxide.

* * * * *

UNITED STATES PATENT AND TRADEMARK OFFICE
CERTIFICATE OF CORRECTION

PATENT NO. : 5,298,473

DATED : March 29, 1994

INVENTOR(S) : Thomas J. Pinnavaia, Jayantha Amarasekera

Page 1 of 3

It is certified that error appears in the above-indentified patent and that said Letters Patent is hereby corrected as shown below:

Column 1, line 33, "problem" should read --problems--.

Column 1, line 48, a period --.-- should be inserted after "purpose".

Column 1, line 57, a period --.-- should be inserted after "capacity.

Column 2, line 58, "El L." should read --E. L.--.

Column 3, line 36, "posses" should read --possess--.

Column 3, line 51, "fludized" should read --fluidized--.

Column 7, line 30, a period --.-- should be inserted after "particles".

Column 8, line 52, "Water" should read --water--.

Column 12, line 27, "Was" should read --was--.

Column 12, line 36, "lost" should read --loss--.

Column 13, line 30, "98.8 of" should read --98.8% of--.

Column 14, line 3, "$NV_4VO_3$" should read --$NH_4VO_3$--.

Column 14, lines 64 and 65, "conversion occurring during first 5 min." (second occurrence) should be deleted.

Column 15, line 20, "ca" should read --Ca--.

UNITED STATES PATENT AND TRADEMARK OFFICE
CERTIFICATE OF CORRECTION

PATENT NO. : 5,298,473

DATED : March 29, 1994

INVENTOR(S) : Thomas J. Pinnavaia, Jayantha Amarasekera

It is certified that error appears in the above-indentified patent and that said Letters Patent is hereby corrected as shown below:

Column 15, line 24, "Where" should read --where--.

Column 15, line 30, "Was" should read --was--.

Column 17, line 34, "thergravimetric" should read --thermogravimetric--.

Column 18, line 54, "they" should read --the--.

Column 19, line 1, "ratio was" should read --ratio as--.

Column 22, line 58 (Claim 2), "of", second occurrence, should be deleted.

Column 23, line 48 (Claim 11), "Wherein" should read --wherein--.

Column 26, line 26 (Claim 47), after "43", --wherein-- should be inserted.

Column 27, line 1, (Claim 53), "(d)" should read --(c)--.

Column 27, line 17 (Claim 57), after "53", --wherein-- should be inserted.

Column 28, line 40 (Claim 73), "(d)" should read --(c)-- and "dry" should be deleted.

Column 28, line 44 (Claim 73), "500°c" should read --500°C--.

UNITED STATES PATENT AND TRADEMARK OFFICE
CERTIFICATE OF CORRECTION

PATENT NO. : 5,298,473

DATED : March 29, 1994

INVENTOR(S) : Thomas J. Pinnavaia, Jayantha Amarasekera

It is certified that error appears in the above-indentified patent and that said Letters Patent is hereby corrected as shown below:

Column 29, line 3 (claim 81) "into" should not be deleted, the word "mixture" is inserted.

Column 29, line 14 (claim 83) "metal", second occurrence, should be deleted.

Signed and Sealed this

Twenty-seventh Day of December, 1994

Attest:

BRUCE LEHMAN

Attesting Officer      Commissioner of Patents and Trademarks